UNITED STATES PATENT OFFICE.

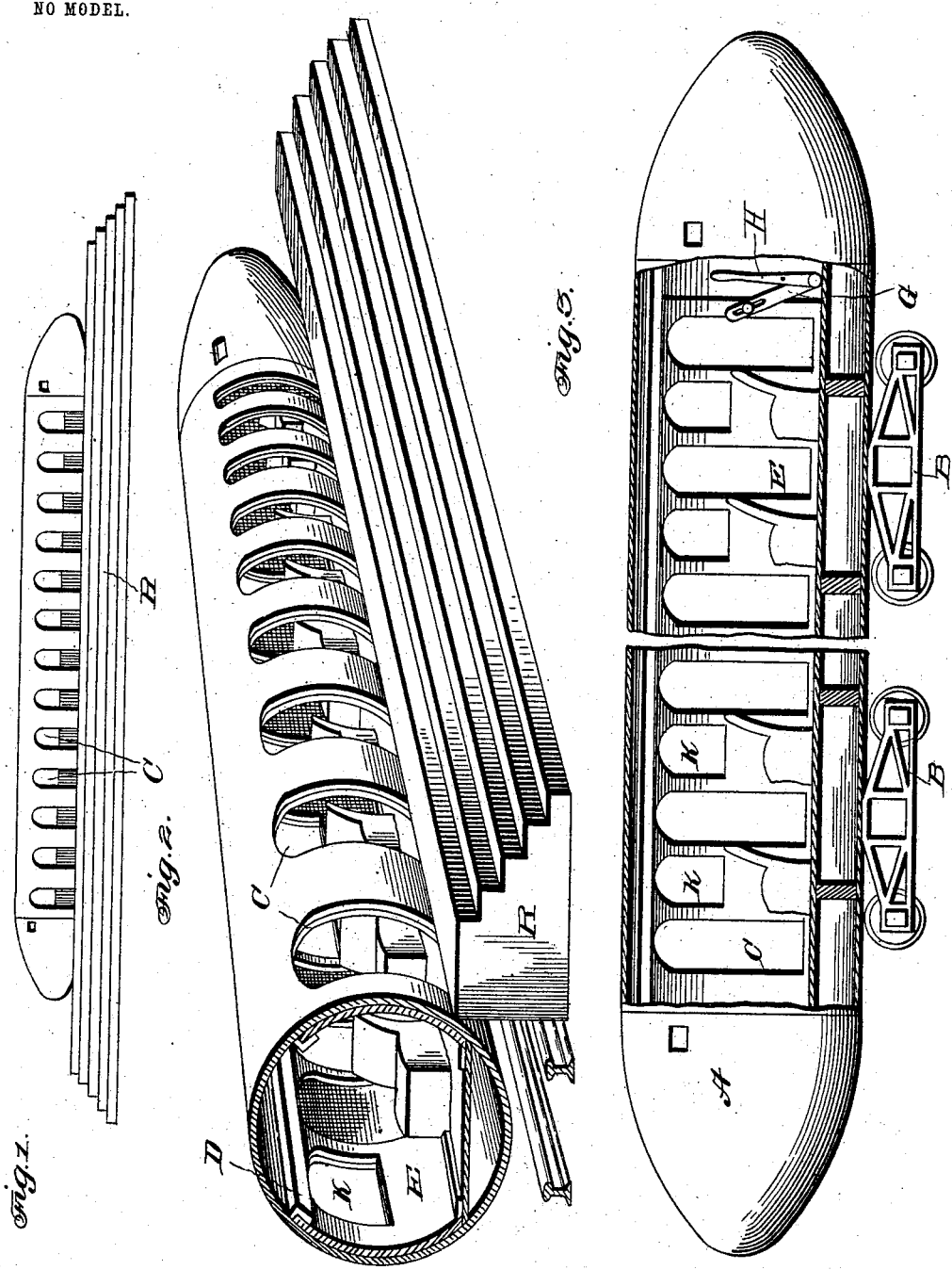

CASPER ZIMMERMAN, OF VIENNA, SOUTH DAKOTA.

RAILWAY-CAR.

SPECIFICATION forming part of Letters Patent No. 718,236, dated January 13, 1903.

Application filed October 25, 1902. Serial No. 128,796. (No model.)

*To all whom it may concern:*

Be it known that I, CASPER ZIMMERMAN, a citizen of the United States, residing at Vienna, in the county of Clark and State of South Dakota, have invented certain new and useful Improvements in Railway-Cars; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in cars, and especially to means for throwing open and closing the doors opposite each seat the entire length of the car, whereby the occupants of a car may make their exit or enter the car at the same time, thus saving in time the filling up and exit from the car.

More specifically the present invention resides in the provision of door-openings preferably opposite each of the seats which are transversely arranged along the car and of a series of doors connected together and adapted to be manipulated by a lever-actuated mechanism, whereby the entire set of doors may be thrown so as to close the door-openings, leaving a window-opening adjacent to each seat and near the door-opening in the car.

In my invention I propose to have the whole series of doors on the side of a car slide longitudinally, being manipulated by a single actuating-lever.

My invention will be hereinafter more fully described and then specifically defined in the appended claims, and is illustrated in the accompanying drawings, which, with the letters of reference marked thereon, form a part of this application, and in which—

Figure 1 is a side elevation of a car embodying my improvements, shown as standing adjacent to a platform. Fig. 2 is a perspective view of the car and platform, on a larger scale, the door-openings on one side of the car being shown as open, while on the opposite side the doors are closed, affording window-openings. Fig. 3 is a view in side elevation of a car, parts being shown in longitudinal section, the car being broken away at its center.

Reference now being had to the details of the drawings by letter, A designates the car proper, which is made, preferably, cylindrical in form and of metal and mounted on suitable trucks B, with the forward and rear ends of the car tapering, as shown, so as to offer as little resistance as possible to the air in rapid transit, for which these cars are especially adapted. Along the sides of the car are the door-openings C, there being one preferably opposite each of the transversely-arranged seats. The platform of the car is opposite the lower margins of the door-apertures, and the seats are arranged between the door-apertures, as shown in the drawings. The doors, which are preferably made on the arc of a circle, so as to conform to the curved sides of the car, are all connected together at their tops and bottoms by longitudinal strips. In the drawings I have shown all of the doors made of a single piece of sheet metal, the upper and lower edges of which are held to the side or shell of the car by means of longitudinally-disposed cleats D, between which and the shell of the car the doors are allowed to slide when it is desired to close or open the doors. At one end of one set of doors E is pivotally secured a lever G, to which is pivoted the lower end of the lever H, said lever being fulcrumed to the side of the car, as clearly illustrated in Fig. 3 of the drawings. It will be observed that the longitudinally-sliding door-section having the door apertures or openings has intermediate each opening a window-opening K, so that when the doors are closed a window-opening will come opposite each door-opening.

At intervals where it is desired to have stations platforms R are built, which are on a level with the lowest margins of the door-openings, so that persons may enter or alight from the cars by simply stepping from the platform into the car or out of the car on the platform without stepping down.

By the provision of means for opening or closing all of the doors of the cars with the movement of a single operating-lever it will be observed that a car may be quickly filled or emptied of its occupants, thus saving appreciably the time of stops at stations, which is a desideratum in rapid transit.

Having thus described my invention, what I claim to be new, and desire to secure by Letters Patent, is—

1. A car having door-openings along its opposite longitudinal portions and opposite each transversely-arranged seat, a sliding door-section held in sliding contact with each side of the car, a lever for actuating said section, each section having a door-opening and an intermediate window-opening, whereby as the doors are opened the windows will be closed, as set forth.

2. A car having door-openings along its longitudinal sides, a sliding door-section held against the inner side of the car, each section having a door-opening and an intermediate window-opening above its middle portion, cleats for confining the opposite longitudinal edges of the door-section, and a lever mechanism for actuating the door-section, as set forth.

3. In combination with a cylindrical-shell car having door-openings at diametrically opposite locations, curved door-sections having door-openings and intermediate window-openings, cleats confining the opposite longitudinal edges of said sections to the side of the car, a lever fulcrumed to the car and having link connections with said sliding section, whereby all of the doors may be closed simultaneously and windows opened by the same movement, as set forth.

In testimony whereof I hereunto affix my signature in presence of two witnesses.

CASPER ZIMMERMAN.

Witnesses:
S. P. SEIERSON,
R. D. BAILEY.